US012132509B2

(12) United States Patent
Loh et al.

(10) Patent No.: US 12,132,509 B2
(45) Date of Patent: Oct. 29, 2024

(54) ULTRAHIGH BAND ARCHITECTURE FOR RADIO FREQUENCY FRONT-ENDS

(71) Applicant: Skyworks Solutions, Inc., Irvine, CA (US)

(72) Inventors: Lup Meng Loh, Thousand Oaks, CA (US); Aleksey A. Lyalin, Moorpark, CA (US); David Richard Pehlke, Westlake Village, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 17/248,059

(22) Filed: Jan. 7, 2021

(65) Prior Publication Data

US 2021/0211145 A1    Jul. 8, 2021

Related U.S. Application Data

(60) Provisional application No. 62/958,587, filed on Jan. 8, 2020.

(51) Int. Cl.
*H04B 1/00* (2006.01)
*H04B 1/50* (2006.01)

(52) U.S. Cl.
CPC ............. *H04B 1/0064* (2013.01); *H04B 1/50* (2013.01)

(58) Field of Classification Search
CPC ................................ H04B 1/0064; H04B 1/50
See application file for complete search history.

(56) References Cited

U.S. PATENT DOCUMENTS

| 9,602,156 | B2 | 3/2017 | Wloczysiak |
| 9,654,169 | B2 | 5/2017 | Wloczysiak |
| 9,985,680 | B2 | 5/2018 | Wloczysiak |
| 10,659,121 | B2* | 5/2020 | Pehlke ................. H04B 7/0413 |
| 11,165,484 | B2* | 11/2021 | Yang .................... H04B 7/0691 |
| 11,336,242 | B2* | 5/2022 | Kim ........................ H03F 3/245 |
| 11,336,406 | B2* | 5/2022 | Park ................... H04B 17/3912 |
| 2004/0102172 | A1 | 5/2004 | Hendin |
| 2005/0277387 | A1* | 12/2005 | Kojima ................. H01Q 21/28 |
| | | | 455/562.1 |
| 2006/0252380 | A1 | 11/2006 | Khayrallah et al. |
| 2007/0249312 | A1 | 10/2007 | Shatara et al. |
| 2008/0224927 | A1 | 9/2008 | De Abreu |
| 2009/0285135 | A1 | 11/2009 | Rousu et al. |

(Continued)

FOREIGN PATENT DOCUMENTS

| CN | 102570027 A | 7/2012 |
| CN | 103178358 A | 6/2013 |

(Continued)

*Primary Examiner* — Jinsong Hu
*Assistant Examiner* — Rui M Hu
(74) *Attorney, Agent, or Firm* — Knobbe, Martens, Olson & Bear, LLP

(57) ABSTRACT

Ultrahigh band (UHB) architectures for radio frequency (RF) front-ends are disclosed. In certain embodiments, an RF front-end for a mobile device includes a first ultrahigh band transmit/receive module connected to a first antenna, a second ultrahigh band transmit/receive module connected to the first antenna, and a first ultrahigh band receive module connected to a second antenna. The first ultrahigh band transmit/receive module is further connected to the second antenna by way of an auxiliary input of the first ultrahigh band receive module.

20 Claims, 11 Drawing Sheets

(56) References Cited

U.S. PATENT DOCUMENTS

| | | |
|---|---|---|
| 2009/0295230 A1 | 12/2009 | Rousu et al. |
| 2010/0022197 A1 | 1/2010 | Kato et al. |
| 2010/0157858 A1 | 6/2010 | Lee et al. |
| 2010/0204587 A1 | 8/2010 | Lin et al. |
| 2010/0260082 A1 | 10/2010 | Lum et al. |
| 2011/0210787 A1 | 9/2011 | Lee et al. |
| 2012/0020280 A1 | 1/2012 | Jansson et al. |
| 2012/0052822 A1 | 3/2012 | Monroe |
| 2012/0112969 A1 | 5/2012 | Caballero et al. |
| 2012/0294201 A1* | 11/2012 | Kurokawa ................ H03F 1/32 330/68 |
| 2012/0300245 A1 | 11/2012 | Chatierjee et al. |
| 2012/0327825 A1 | 12/2012 | Gudem et al. |
| 2013/0037924 A1 | 2/2013 | Lee et al. |
| 2013/0051284 A1 | 2/2013 | Khlat |
| 2013/0109333 A1 | 5/2013 | Rowson et al. |
| 2013/0162486 A1 | 6/2013 | Korva et al. |
| 2013/0321095 A1 | 12/2013 | Lam et al. |
| 2014/0003300 A1 | 1/2014 | Weissman et al. |
| 2014/0024322 A1* | 1/2014 | Khlat .................. H04B 7/0602 455/78 |
| 2014/0105079 A1 | 4/2014 | Bengtsson et al. |
| 2014/0133364 A1 | 5/2014 | Weissman et al. |
| 2014/0266429 A1 | 9/2014 | Khlat et al. |
| 2015/0126136 A1 | 5/2015 | Robinett et al. |
| 2015/0373711 A1* | 12/2015 | Narathong .......... H04B 1/0057 370/280 |
| 2016/0352373 A1 | 12/2016 | Wloczysiak |
| 2017/0155421 A1* | 6/2017 | Wloczysiak ......... H04B 1/0064 |
| 2017/0230088 A1 | 8/2017 | Wloczysiak |
| 2017/0294947 A1* | 10/2017 | Little .................. H04B 7/0825 |
| 2017/0373730 A1* | 12/2017 | Pehlke ................ H04B 7/0413 |
| 2018/0007600 A1* | 1/2018 | Gopal .................. H04B 7/0404 |
| 2018/0019768 A1* | 1/2018 | King .................. H04L 27/0002 |
| 2018/0294858 A1* | 10/2018 | Pehlke ...................... H04B 1/40 |
| 2018/0331714 A1* | 11/2018 | See ...................... H04B 7/0814 |
| 2019/0007073 A1* | 1/2019 | King .................... H04B 1/0057 |
| 2019/0097715 A1* | 3/2019 | Maldonado .......... H04B 7/0814 |
| 2019/0356344 A1* | 11/2019 | Takada ................ H04B 1/0064 |
| 2020/0028562 A1* | 1/2020 | Yang .................. H04B 1/0064 |
| 2020/0112348 A1* | 4/2020 | Pehlke ................ H04B 7/0413 |
| 2020/0127698 A1* | 4/2020 | Cho .................... H04B 1/0057 |
| 2020/0313812 A1* | 10/2020 | Park ...................... H04L 5/001 |
| 2020/0366320 A1* | 11/2020 | An .......................... H04B 1/44 |
| 2020/0395959 A1* | 12/2020 | Gluck .................. H04W 48/18 |
| 2021/0029275 A1* | 1/2021 | Choi .................... G06F 1/1686 |
| 2021/0083635 A1* | 3/2021 | Kim .................... H04B 1/1607 |
| 2021/0099205 A1* | 4/2021 | Seyed .................. H04B 7/0602 |
| 2021/0175940 A1* | 6/2021 | Yang .................. H04B 7/0691 |
| 2021/0194111 A1 | 6/2021 | Weis .................... H05K 1/025 |

FOREIGN PATENT DOCUMENTS

| | | |
|---|---|---|
| CN | 103390796 A | 11/2013 |
| EP | 2523355 A1 | 11/2012 |
| EP | 2720378 A1 | 4/2014 |
| JP | 2003-032140 A | 1/2003 |
| JP | 2003-087023 A | 3/2003 |
| JP | 2003-169008 A | 6/2003 |
| JP | 2009-016921 A | 1/2009 |
| JP | 2010-252346 A | 11/2010 |
| JP | 2012-105334 A | 5/2012 |
| WO | WO 2013/041146 A1 | 3/2013 |
| WO | WO 2013/131051 A1 | 9/2013 |
| WO | WO 2014/088218 A1 | 6/2014 |
| WO | WO 2015/117433 A1 | 8/2015 |

* cited by examiner mXn DL MIMO nXm UL MIMO

ULTRAHIGH BAND ARCHITECTURE FOR RADIO FREQUENCY FRONT-ENDS

CROSS-REFERENCE TO RELATED APPLICATIONS

This application claims the benefit of priority under 35 U.S.C. § 119 of U.S. Provisional Patent Application No. 62/958,587, filed Jan. 8, 2020 and titled "UHB ARCHITECTURE FOR RADIO FREQUENCY FRONT-ENDS," which is herein incorporated by reference in its entirety.

BACKGROUND

Field

Embodiments of the invention relate to electronic systems, and in particular, to radio frequency electronics.

Description of Related Technology

Radio frequency (RF) communication systems can be used for transmitting and/or receiving signals of a wide range of frequencies. For example, an RF communication system can be used to wirelessly communicate RF signals in a frequency range of about 30 kHz to 300 GHz, such as in the range of about such as in the range of about 410 MHz to about 7.125 GHz for Fifth Generation (5G) cellular communications in Frequency Range 1 (FR1).

Examples of RF communication systems include, but are not limited to, mobile phones, tablets, base stations, network access points, customer-premises equipment (CPE), laptops, and wearable electronics.

SUMMARY

In certain embodiments, the present disclosure relates to a mobile device. The mobile device includes a plurality of antennas including a first antenna and a second antenna, a transceiver, and a radio frequency front-end system electrically coupled between the transceiver and the plurality of antennas. The radio frequency front-end system includes a first ultrahigh band transmit/receive module connected to the first antenna, a second ultrahigh band transmit/receive module connected to the first antenna, and a first ultrahigh band receive module connected to the second antenna. The first ultrahigh band transmit/receive module is further connected to the second antenna by way of an auxiliary input of the first ultrahigh band receive module.

In some embodiments, the plurality of antennas further includes a third antenna and a fourth antenna, and the radio frequency front-end system further includes a second ultrahigh band receive module connected to the third antenna and a third ultrahigh band receive module connected to the fourth antenna. According to a number of embodiments, the second ultrahigh band transmit/receive module includes a first auxiliary output connected to the third antenna by way of an auxiliary input of the second ultrahigh band receive module, and a second auxiliary output connected to the fourth antenna by way of an auxiliary input of the third ultrahigh band receive module. In accordance with several embodiments, the second ultrahigh band transmit/receive module further includes a third auxiliary output connected to an auxiliary input of the first ultrahigh band transmit/receive module. According to various embodiments, the ultrahigh band modules collectively support all fourth generation and fifth generation downlink carrier aggregation scenarios in the ultrahigh band frequency range. In accordance with a number of embodiments, the ultrahigh band modules collectively support all fourth generation and fifth generation uplink carrier aggregation scenarios in the ultrahigh band frequency range. According to several embodiments, the ultrahigh band modules collectively support four by four downlink multi-input multiple-output communications in the ultrahigh band frequency range.

In various embodiments, the first ultrahigh band transmit/receive module is operable over a first ultrahigh frequency band and the second ultrahigh band transmit/receive module is operable over a second ultrahigh frequency band. According to a number of embodiments, each of the first ultrahigh band receive module, the second ultrahigh band receive module, and the third ultrahigh band receive module include a first signal path for processing the first ultrahigh frequency band and a second signal path for processing the second ultrahigh frequency band. In accordance with several embodiments, the first ultrahigh frequency band is n79 and the second ultrahigh frequency band is n77. According to some embodiments, the radio frequency front end system further includes an antenna-plexer, the first ultrahigh band transmit/receive module connected to the first antenna by way of a first filtering structure of the antenna-plexer, and the second ultrahigh band transmit/receive module connected to the first antenna by way of a second filtering structure of the antenna-plexer. In accordance with a number of embodiments, the first filtering structure provides band filtering for the first ultrahigh frequency band, and the second filtering structure provides band filtering for the second ultrahigh frequency band.

In several embodiments, an auxiliary output of the first ultrahigh band transmit/receive module is connected to an auxiliary input of the second ultrahigh band transmit/receive module.

In a number of embodiments, the mobile device further includes a power management system including a first envelope tracker configured to generate a first power amplifier supply voltage for the first ultrahigh band transmit/receive module and a second envelope tracker configured to generate a second power amplifier supply voltage for the second ultrahigh band transmit/receive module. According to several embodiments, the mobile device further includes at least one module also powered by the first envelope tracker.

In some embodiments, each of the ultrahigh band modules operates at a frequency greater than about 3.0 gigahertz.

In various embodiments, each of the ultrahigh band modules provides radio frequency signal processing in a frequency range between about 3.0 gigahertz and about 6.0 gigahertz.

In several embodiments, the ultrahigh band modules collectively support two by two uplink multi-input multiple-output communications in the ultrahigh band frequency range.

In certain embodiments, radio frequency front-end system is provided. The radio frequency front-end system includes a plurality of antenna terminals including a first antenna terminal and a second antenna terminal, and a plurality of ultrahigh band modules including a first ultrahigh band transmit/receive module connected to the first antenna terminal, a second ultrahigh band transmit/receive module connected to the first antenna terminal, and a first ultrahigh band receive module connected to the second antenna terminal. The first ultrahigh band transmit/receive module is connected to the second antenna terminal by way of an auxiliary input of the first ultrahigh band receive module.

In various embodiments, the plurality of antenna terminals further includes a third antenna terminal and a fourth terminal, and the plurality of ultrahigh band modules further includes a second ultrahigh band receive module connected to the third antenna terminal and a third ultrahigh band receive module connected to the fourth antenna terminal. According to a number of embodiments, the second ultrahigh band transmit/receive module includes a first auxiliary output connected to the third antenna terminal by way of an auxiliary input of the second ultrahigh band receive module, and a second auxiliary output connected to the fourth antenna terminal by way of an auxiliary input of the third ultrahigh band receive module. In accordance with several embodiments, the second ultrahigh band transmit/receive module further includes a third auxiliary output connected to an auxiliary input of the first ultrahigh band transmit/receive module. According to various embodiments, the ultrahigh band modules collectively support all fourth generation and fifth generation downlink carrier aggregation scenarios in the ultrahigh band frequency range. In accordance with a number of embodiments, the ultrahigh band modules collectively support all fourth generation and fifth generation uplink carrier aggregation scenarios in the ultrahigh band frequency range. According to several embodiments, the ultrahigh band modules collectively support four by four downlink multi-input multiple-output communications in the ultrahigh band frequency range.

In some embodiments, the first ultrahigh band transmit/receive module is operable over a first ultrahigh frequency band and the second ultrahigh band transmit/receive module is operable over a second ultrahigh frequency band. According to several embodiments, each of the first ultrahigh band receive module, the second ultrahigh band receive module, and the third ultrahigh band receive module include a first signal path for processing the first ultrahigh frequency band and a second signal path for processing the second ultrahigh frequency band. In accordance with various embodiments, the first ultrahigh frequency band is n79 and the second ultrahigh frequency band is n77. According to a number of embodiments, the radio frequency front end system further includes an antenna-plexer, the first ultrahigh band transmit/receive module connected to the first antenna terminal by way of a first filtering structure of the antenna-plexer, and the second ultrahigh band transmit/receive module connected to the first antenna terminal by way of a second filtering structure of the antenna-plexer. In accordance with several embodiments, the first filtering structure provides band filtering for the first ultrahigh frequency band, and the second filtering structure provides band filtering for the second ultrahigh frequency band.

In various embodiments, an auxiliary output of the first ultrahigh band transmit/receive module is connected to an auxiliary input of the second ultrahigh band transmit/receive module.

In a number of embodiments, each of the ultrahigh band modules operate at a frequency greater than about 3.0 gigahertz.

In various embodiments, each of the ultrahigh band modules provides radio frequency signal processing in a frequency range between about 3.0 gigahertz and about 6.0 gigahertz.

In a number of embodiments, the ultrahigh band modules collectively support two by two uplink multi-input multiple-output communications in the ultrahigh band frequency range.

In certain embodiments, the present disclosure relates to a method of radio frequency signal communication in a mobile device. The method includes transmitting a first transmit signal and receiving a first receive signal by way of a first antenna using a first ultrahigh band transmit/receive module, transmitting a second transmit signal and receiving a second receive signal by way of the first antenna using a second ultrahigh band transmit/receive module, receiving a third receive signal by way of a second antenna using a first ultrahigh band receive module, and transmitting a third transmit signal from the first ultrahigh band transmit/receive module to the second antenna by way of an auxiliary input of the first ultrahigh band receive module.

In some embodiments, the method further includes receiving a fourth receive signal by way of a third antenna using a second ultrahigh band receive module, and receiving a fifth receive signal by way of a fourth antenna using a third ultrahigh band receive module. According to various embodiments, the method further includes transmitting a fourth transmit signal from the second ultrahigh band transmit/receive module to the third antenna by way of an auxiliary input of the second ultrahigh band receive module, and transmitting a fifth transmit signal from the second ultrahigh band transmit/receive module to the fourth antenna by way of an auxiliary input of the third ultrahigh band receive module.

In various embodiments, the method further includes operating the first ultrahigh band transmit/receive module over a first ultrahigh frequency band and operating the second ultrahigh band transmit/receive module over a second ultrahigh frequency band. According to a number of embodiments, the first ultrahigh frequency band is n79 and the second ultrahigh frequency band is n77. In accordance with several embodiments, the method further includes providing the first transmit signal to the first antenna by way of a first filtering structure of an antenna-plexer, and providing the second transmit signal to the second antenna by way of a second filtering structure of the antenna-plexer. According to some embodiments, the method further includes providing band filtering of the first ultrahigh frequency band using the first filtering structure, and providing band filtering of the second ultrahigh frequency band using the second filtering structure.

In a number of embodiments, the method further includes generating a first power amplifier supply voltage for the first ultrahigh band transmit/receive module using a first envelope tracker and generating a second power amplifier supply voltage for the second ultrahigh band transmit/receive module using a second envelope tracker. According to several embodiments, powering at least one additional module using the first envelope tracker.

DETAILED DESCRIPTION OF EMBODIMENTS

Figure 1:
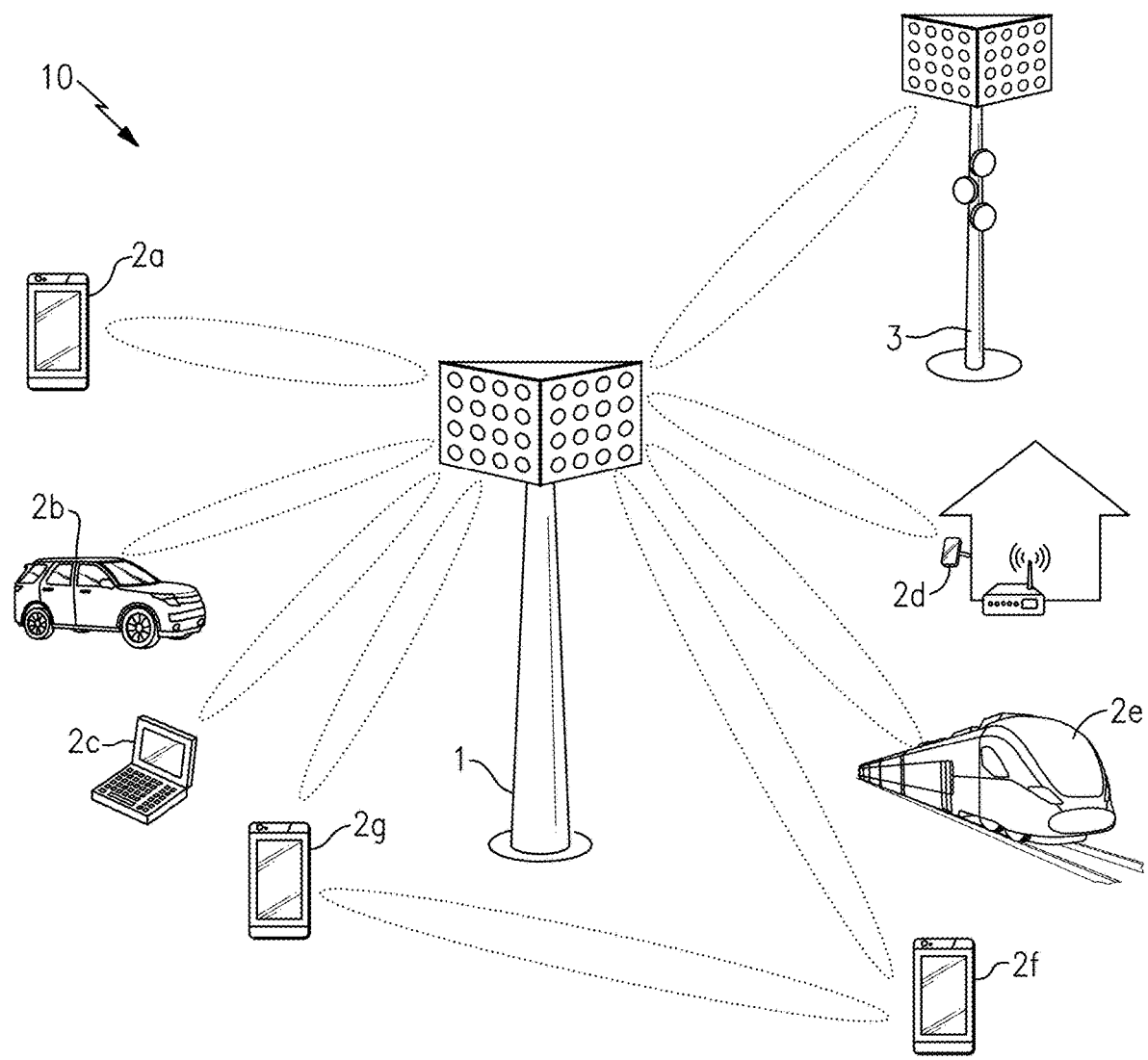
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and plans to introduce Phase 2 of 5G technology in Release 16 (targeted for 2019). Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 2f).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
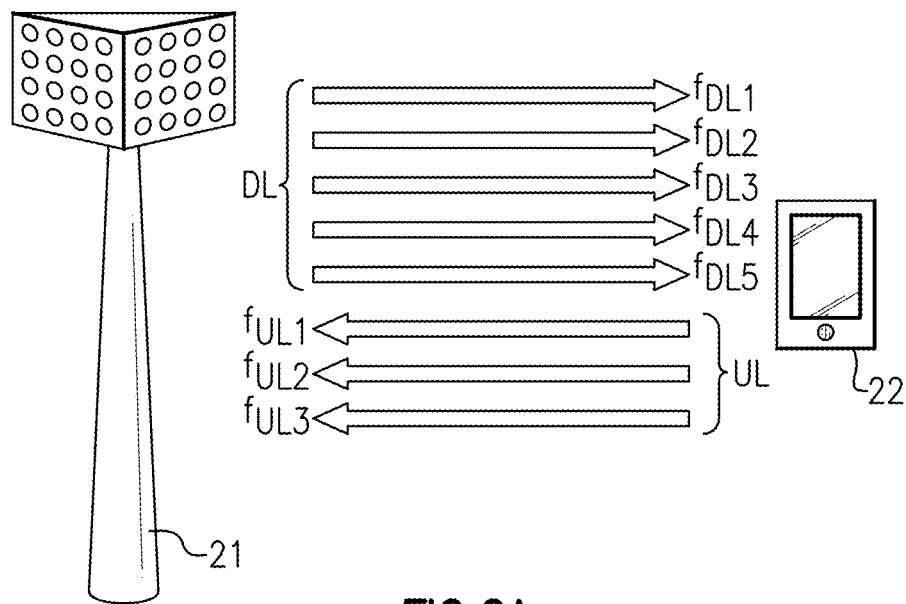
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
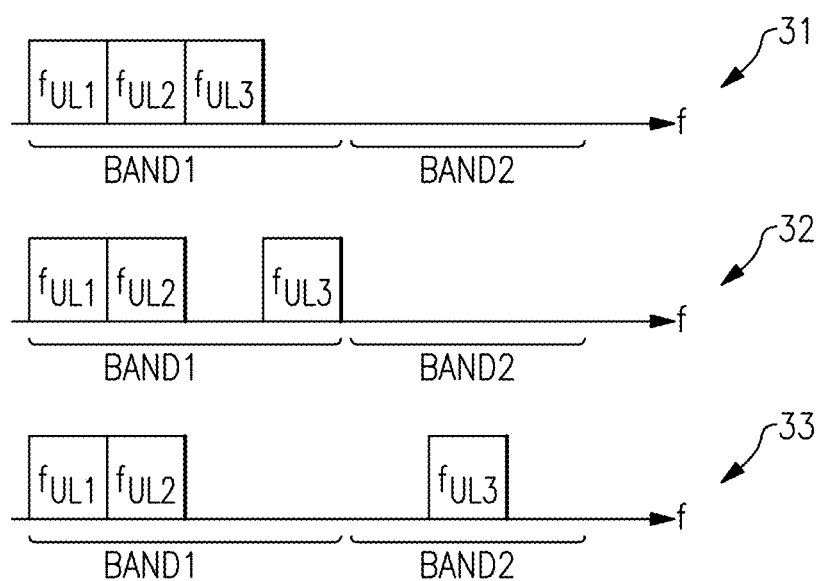
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL}3$ of a second frequency band BAND2.

Figure 2C:
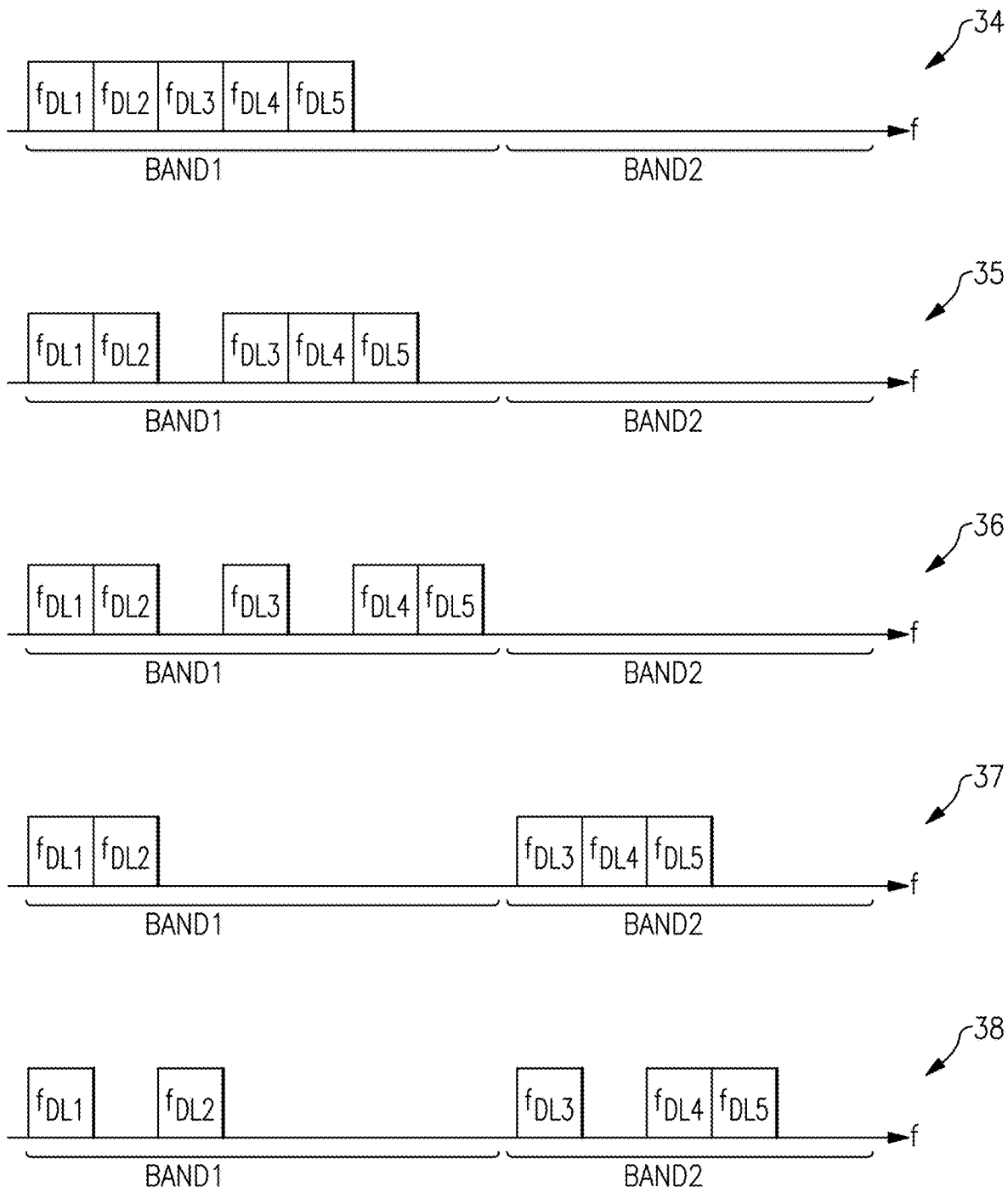
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink.

Figure 3A:
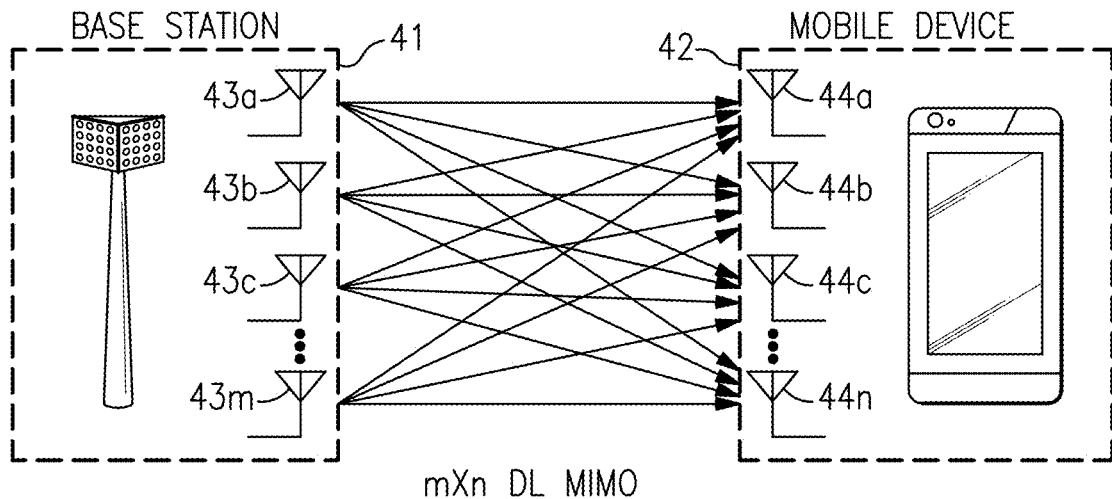
FIG. 3A is a schematic diagram of one example of a downlink channel using multi-input and multi-output (MIMO) communications.
Figure 3B:
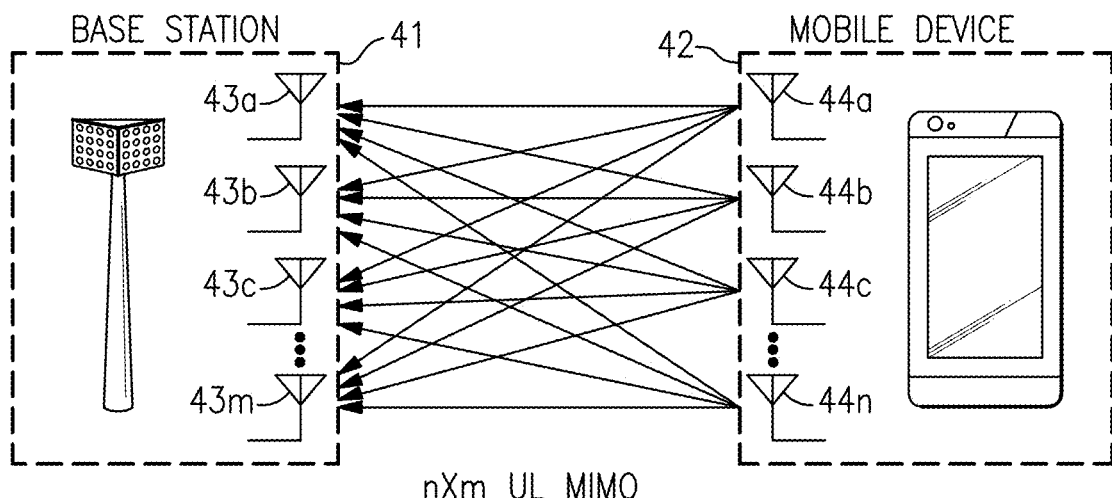
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas 43a, 43b, 43c, . . . 43m of the base station 41 and receiving using N antennas 44*a*, 44*b*, 44*c*, . . . 44*n* of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas 44*a*, 44*b*, 44*c*, . . . 44*n* of the mobile device 42 and receiving using M antennas 43*a*, 43*b*, 43*c*, . . . 43*m* of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
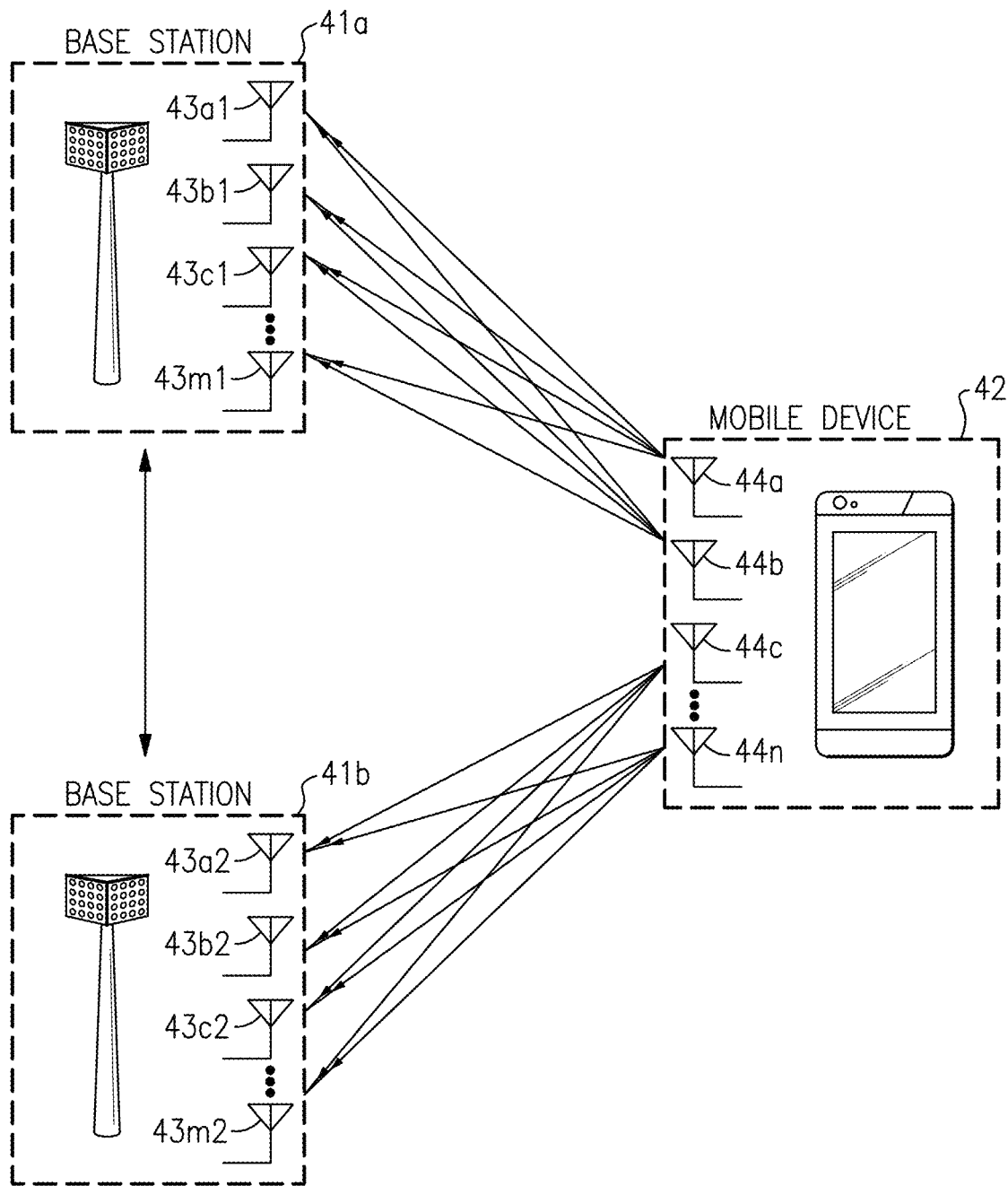
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas 44*a*, 44*b*, 44*c*, . . . 44*n* of the mobile device 42. Additional a first portion of the uplink transmissions are received using M antennas 43*a*1, 43*b*1, 43*c*1, . . . 43*m*1 of a first base station 41*a*, while a second portion of the uplink transmissions are received using M antennas 43*a*2, 43*b*2, 43*c*2, . . . 43*m*2 of a second base station 41*b*. Additionally, the first base station 41*a* and the second base station 41*b* communication with one another over wired, optical, and/or wireless links.

The MIMO scenario of FIG. 3C illustrates an example in which multiple base stations cooperate to facilitate MIMO communications.

Examples of UHB Architectures for RF Communication Systems

A radio frequency (RF) communication device can include multiple antennas for supporting wireless communications. Additionally, the RF communication device can include a radio frequency front-end (RFFE) system for processing signals received from and transmitted by the antennas. The RFFE system can provide a number of functions, including, but not limited to, signal filtering, signal partitioning and combining, controlling component connectivity to the antennas, and/or signal amplification.

RFFE systems can be used to handle RF signals of a wide variety of types, including, but not limited to, wireless local area network (WLAN) signals, Bluetooth signals, and/or cellular signals.

Additionally, RFFE systems can be used to process signals of a wide range of frequencies. For example, certain RFFE systems can operate using one or more low bands (for example, RF signal bands having a frequency content of 1 GHz or less, also referred to herein as LB), one or more mid bands (for example, RF signal bands having a frequency content between 1 GHz and 2.3 GHz, also referred to herein as MB), one or more high bands (for example, RF signal bands having a frequency content between 2.3 GHz and 3 GHz, also referred to herein as HB), and one or more ultrahigh bands (for example, RF signal bands having a frequency content between 3 GHz and 6 GHz, also referred to herein as UHB).

RFFE systems can be used in a wide variety of RF communication devices, including, but not limited to, smartphones, base stations, laptops, handsets, wearable electronics, and/or tablets.

An RFFE system can be implemented to support a variety of features that enhance bandwidth and/or other performance characteristics of the RF communication device in which the RFFE system is incorporated.

In one example, an RFFE system is implemented to support carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels, for instance up to five carriers. Carrier aggregation includes contiguous aggregation, in which contiguous carriers within the same operating frequency band are aggregated. Carrier aggregation can also be non-contiguous, and can include carriers separated in frequency within a common band or in different bands.

In another example, an RFFE system is implemented to support multi-input and multi-output (MIMO) communications to increase throughput and enhance mobile broadband service. MIMO communications use multiple antennas for communicating multiple data streams over a single radio frequency channel. MIMO communications benefit from higher signal to noise ratio, improved coding, and/or reduced signal interference due to spatial multiplexing differences of the radio environment. MIMO order refers to a number of separate data streams sent or received. For instance, a MIMO order for downlink communications can be described by a number of transmit antennas of a base station and a number of receive antennas for user equipment (UE), such as a mobile device.

RFFE systems that support carrier aggregation and multi-order MIMO can be used in RF communication devices that operate with wide bandwidth. For example, such RFFE systems can be used in applications servicing multimedia content streaming at high data rates. For example, 5G technology seeks to achieve high peak data rates above 10 Gbps. Certain 5G high-speed communications can be referred to herein as Enhanced Multi-user Broadband (eMBB).

Although UHB architectures for RFFE systems are described herein, such RFFE systems can also operate using LB, MB, and HB frequencies and beyond (for instance, upper centimeter wave and/or millimeter wave frequencies).

In certain implementations, the UHB architectures herein support EN-DC, uplink carrier aggregation, downlink carrier aggregation, uplink MIMO (for instance, 2×2 TX MIMO), and/or downlink MIMO (for instance, 4×4 RX MIMO) using one or more UHB frequency bands, such as Band 42 (about 3.4 GHz to about 3.6 GHz), Band 43 (about 3.6 GHz to about 3.8 GHz), Band 48 (about 3.55 GHz to about 3.7 GHz), Band n77 (about 3.3 GHz to about 4.2 GHz), Band n78 (about 3.3 GHz to about 3.8 GHz), and/or Band n79 (about 4.4 GHz to about 5.0 GHz).

By enabling high-order MIMO and/or carrier aggregation features using UHB spectrum, enhanced data rates can be achieved. Additionally, rather than using dedicated 5G antennas and a separate transceiver, shared antennas and/or a shared transceiver (for example, a semiconductor die including a shared transceiver fabricated thereon) can be used for both 5G UHB communications and 4G/LTE communications associated with HB, MB, and/or LB. Thus, 4G/LTE communication systems can be extended to support sub-6 GHz 5G capabilities with a relatively small impact to system size and/or cost.

Thus, low cost UHB architectures for supporting UHB features for 3GPP 4G and 5G standards are provided. For example, certain UHB architectures herein support all current EN-DC, uplink carrier aggregation, uplink MIMO, downlink carrier aggregation, and downlink MIMO features for all 3GPP 4G and 5G UHB bands, including frequency bands n77, n78, n79, B42, B43, and B48. Moreover, the UHB architecture supports transmit antenna swapping and full sounding resource signal (SRS) support for UHB MIMO antennas.

Figure 4A:
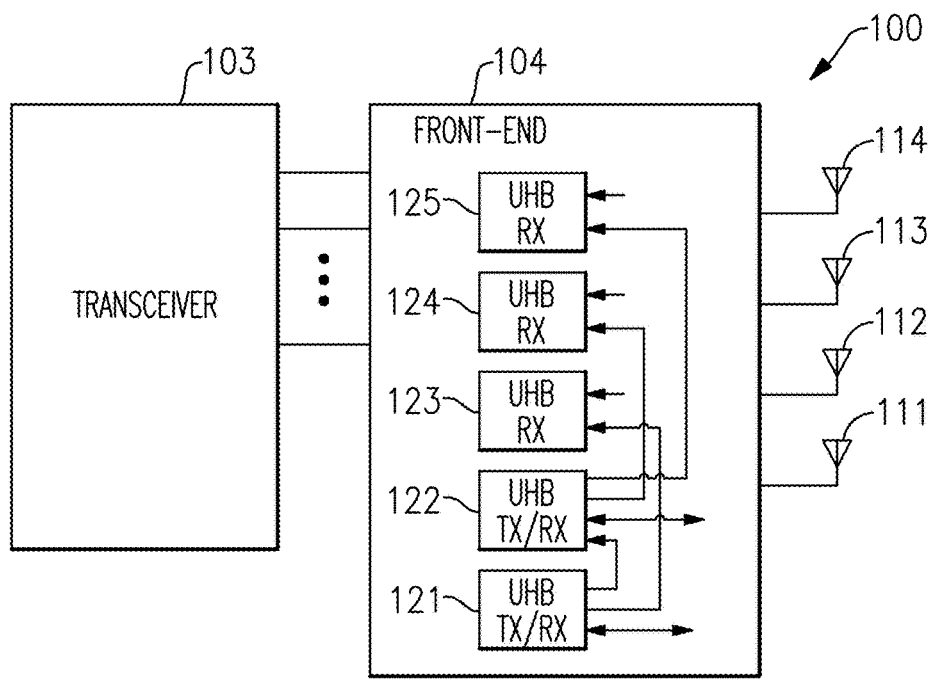
FIG. 4A is a schematic diagram of a radio frequency (RF) communication system according to one embodiment.

FIG. 4A is a schematic diagram of an RF communication system 100 according to one embodiment. The RF communication system 100 includes a transceiver 103, a front-end system 104, and antennas 111-114.

Although the RF communication system 100 is depicted as including certain components, other implementations are possible, including, but not limited to, implementations using other numbers of antennas, different implementations of components, and/or additional components.

In the illustrated embodiment, the front-end system 104 includes a first UHB transmit/receive (TX/RX) module 121, a second UHB TX/RX module 122, a first UHB RX module 123, a second UHB RX module 124, and a fifth UHB RX module 125. The front-end system 104 further includes separate antenna terminals for coupling to each of the antennas 111-114.

The front-end system 104 of FIG. 4A includes multiple UHB modules for supporting communications of UHB signals across multiple antennas. Accordingly, broadband communications via UHB frequency carriers can be achieved. Moreover, use of separate modules provides flexibility in placements across an RF communication system (for instance, a mobile device) and provides enhanced isolation for dual uplink operations relative to dual uplink provided using a common module.

For clarity of the figures, the front-end system 104 is depicted as including only the UHB modules 121-125. However, the front-end system 104 typically includes additionally components and circuits, for example, modules associated with LB, MB, and/or HB cellular communications. Furthermore, modules can be included for Wi-Fi, Bluetooth, and/or other non-cellular communications.

As shown in FIG. 4A, the first UHB RX module 123 includes a primary input terminal for receiving a first RF receive signal, the second UHB RX module 124 includes a primary input terminal for receiving a second RF receive signal, and the third UHB RX module 125 includes a primary input terminal for receiving a third RF receive signal. In certain implementations, the first RF receive signal, the second RF receive signal, and the third RF receive signal are received from the second antenna 112, the third antenna 113, and the fourth antenna 114, respectively. Although each UHB RX module is shown as including one primary input terminal, in certain implementations each UHB RX modules includes multiple (for instance, two) primary input terminals.

With continuing reference to FIG. 4A, the first UHB TX/RX module 121 includes a primary bidirectional terminal and the second UHB TX/RX module 122 includes a primary bidirectional terminal. In certain implementations, the primary bidirectional terminal of the first UHB TX/RX module 121 and the primary bidirectional terminal of the second UHB TX/RX module 122 are each connected to the first antenna 111 by way of an antenna-plexer (for instance, a diplexer, a triplexer, or other suitable circuitry for multiplexing multiple components to an antenna).

In the illustrated embodiment, the first UHB TX/RX module 121 and the second UHB TX/RX module each include auxiliary output terminals for providing interconnections to provide UHB feature support. In the illustrated embodiment, the first UHB TX/RX module 121 includes a first auxiliary output terminal connected to an auxiliary input terminal of the second UHB TX/RX module 122 and a second auxiliary output terminal connected to an auxiliary input terminal of the first UHB RX module 123 (thereby supporting transmissions through the first UHB RX module 123). Additionally, the second UHB TX/RX module 122 includes a first auxiliary output terminal connected to an auxiliary input terminal of the third UHB RX module 125 and a second auxiliary output terminal connected to an auxiliary input terminal of the second UHB RX module 124.

By providing auxiliary terminals in this manner, enhanced configurability for feature support (for instance, EN-DC, carrier aggregation, and MIMO features) is provided.

Figure 4B:
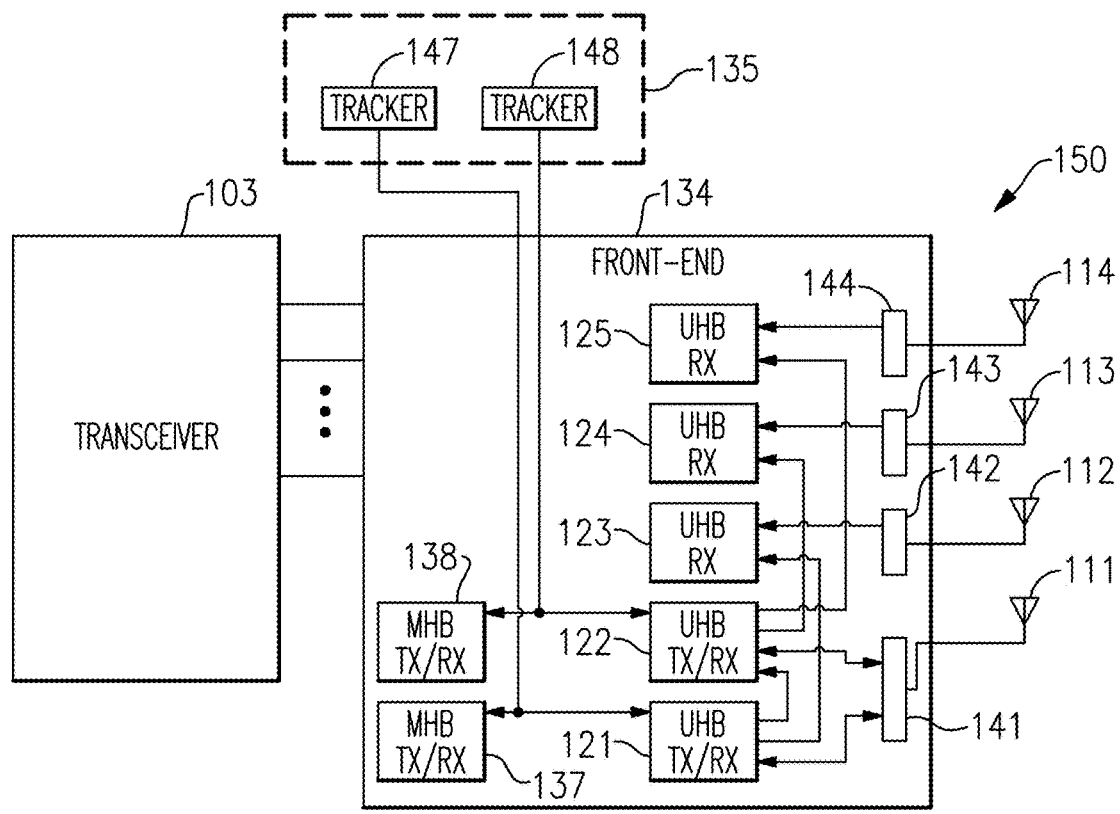
FIG. 4B is a schematic diagram of an RF communication system according to another embodiment.

FIG. 4B is a schematic diagram of an RF communication system 150 according to another embodiment. The RF communication system 150 includes a transceiver 103, antennas 111-114, a front-end system 134, and a power management system 135.

As shown in FIG. 4B, the front-end system 134 includes a first UHB TX/RX module 121, a second UHB TX/RX module 122, a first UHB RX module 123, a second UHB RX module 124, a fifth UHB RX module 125, a MB/HB (MHB) TX/RX module 137, a MHB TX/RX module 138, a first antenna-plexer 141, a second antenna plexer 142, a third antenna-plexer 143, a fourth antenna-plexer 144.

In the illustrated embodiment, the UHB modules 121-125 are interconnected with one another as was described above for the front-end system 104 of FIG. 4A. Additionally, the primary bidirectional terminal of the first UHB TX/RX module 121 is connected to the first antenna 111 by way of the first antenna-plexer 141, the primary bidirectional terminal of the second UHB TX/RX module 122 is connected to the first antenna 111 by way of the first antenna-plexer 141, the primary input terminal of the first UHB RX module 123 is connected to the second antenna 112 by way of the second antenna-plexer 142, the primary input terminal of the second UHB RX module 124 is connected to the third antenna 113 by way of the third antenna-plexer 143, and the primary input terminal of the third UHB RX module 125 is connected to the fourth antenna 114 by way of the antenna-plexer 144.

As shown in FIG. 4B, the power management system 135 includes a first envelope tracker 147 and the second envelope tracker 148. The first envelope tracker 147 generates a first power amplifier supply voltage for a power amplifier of the first UHB TX/RX module 121. When the first UHB TX/RX module 121 is transmitting an RF signal, the first envelope tracker 147 controls the voltage level of the first power amplifier supply voltage in relation to an envelope of the RF signal. The second envelope tracker 147 generates a second power amplifier supply voltage for a power amplifier of the second UHB TX/RX module 122 in accordance with envelope tracking.

In the illustrated embodiment, the first envelope tracker 147 and the second envelope tracker 148 are each also shared with at least one other module of the front-end system 134. For example, as shown in FIG. 4B, the first envelope tracker 147 is also used to provide envelope tracking for the first MHB TX/RX module 137, and the second envelope tracker 148 is also used to provide envelope tracking for the second MHB TX/RX module 138.

Figure 5:
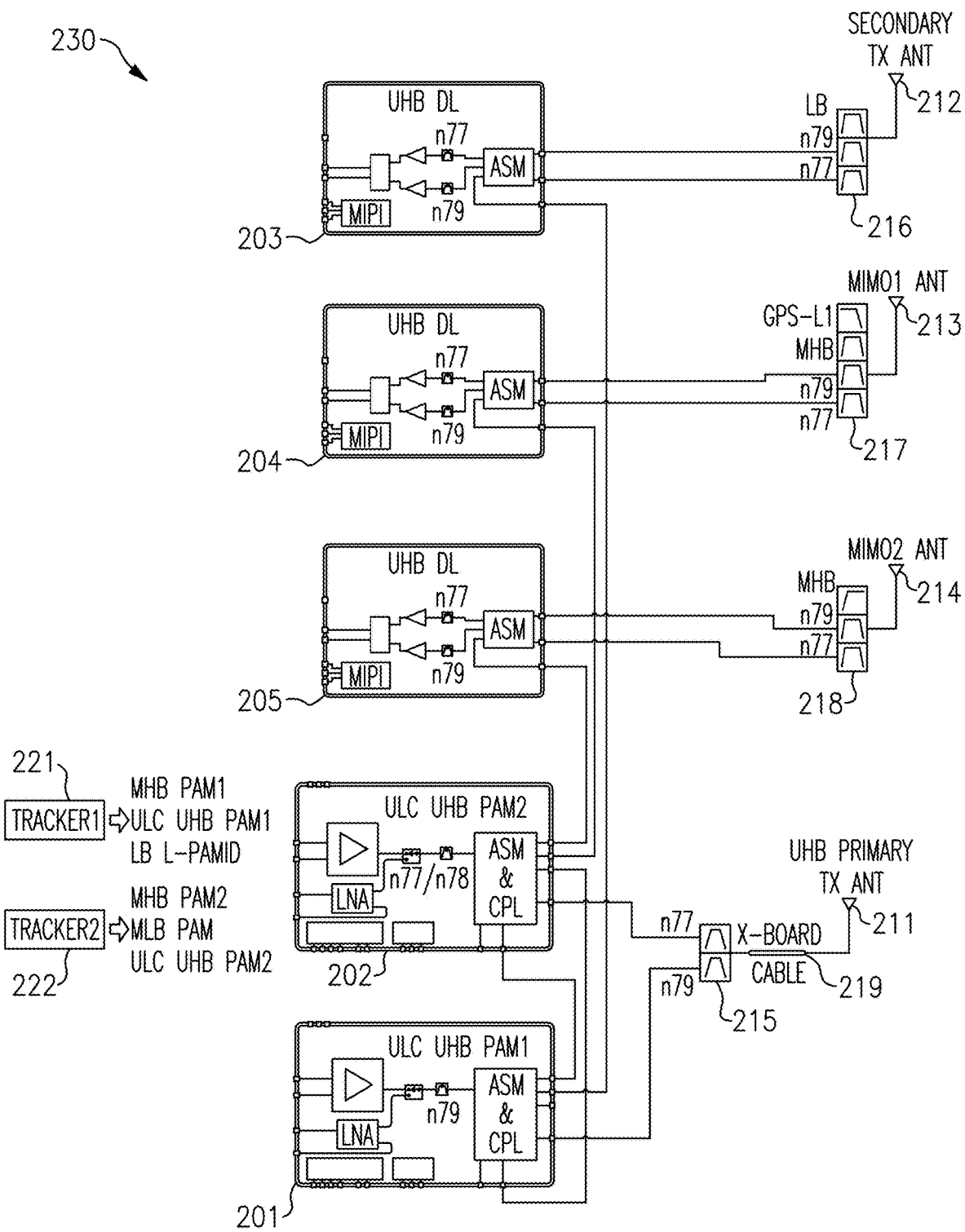
FIG. 5 is a schematic diagram of an RF communication system according to another embodiment.

FIG. 5 is a schematic diagram of an RF communication system 230 according to another embodiment. The RF communication system 230 includes a first UHB TX/RX module 201, a second UHB TX/RX module 202, a first UHB RX module 203, a second UHB RX module 204, a third UHB RX module 205, a UHB primary TX antenna 211, a secondary TX antenna 212, a first MIMO antenna 213, a second MIMO antenna 214, an n77/n79 diplexer, a LB/n79/n77 triplexer 216, a GPS/MHB/n79/n77 quadplexer 217, an MHB/n79/n77 triplexer 218, a cross board (X-board) cable 219, a first envelope tracker 221, and a second envelope tracker 222.

In the illustrated embodiment, the first UHB TX/RX module 201 operates to transmit and receive over n79, while the second UHB TX/RX module 202 operates to transmit and receive over n77 and n78. Additionally, each of the first UHB RX module 203, the second UHB RX module 204, and the third UHB RX module 205 is configurable between an n77 receive mode and an n79 receive mode.

As shown in FIG. 5, a primary bidirectional terminal of the first UHB TX/RX module 201 is connected to the UHB primary TX antenna 211 by way of an n79 terminal of the n77/n79 diplexer 215 and the X-board cable 219, while a primary bidirectional terminal of the second UHB TX/RX module 202 is connected to the UHB primary TX antenna 211 by way of an n77 terminal of the n77/n79 diplexer 215 and the X-board cable 219.

With continuing reference to FIG. 5, a first primary receive terminal of the first UHB RX module 203 is connected to the secondary TX antenna 212 by way of an n79 terminal of the triplexer 216, while a second primary receive terminal of the first UHB RX module 203 is connected to the secondary TX antenna 212 by way of an n77 terminal of the triplexer 216. Additionally, a first primary receive terminal of the second UHB RX module 204 is connected to the first MIMO antenna 213 by way of an n79 terminal of the quadplexer 217, while a second primary receive terminal of the second UHB RX module 204 is connected to the first MIMO antenna 213 by way of an n77 terminal of the quadplexer 217. Furthermore, a first primary receive terminal of the third UHB RX module 205 is connected to the second MIMO antenna 214 by way of an n79 terminal of the triplexer 218, while a second primary receive terminal of the third UHB RX module 205 is connected to the second MIMO antenna 214 by way of an n77 terminal of the triplexer 218.

In the illustrated embodiment, a first auxiliary output terminal of the first UHB TX/RX module 201 is connected to an auxiliary input terminal of the second UHB TX/RX module 202, and a second auxiliary output terminal of the first UHB TX/RX module 201 is connected to an auxiliary input terminal of the first UHB RX module 203. Additionally, a first auxiliary output terminal of the second UHB TX/RX module 202 is connected to an auxiliary input terminal of the third UHB RX module 205, a second auxiliary output terminal of the second UHB TX/RX module 202 is connected to an auxiliary input terminal of the second UHB RX module 204, and a third auxiliary output terminal of the second UHB TX/RX module 202 is connected to an auxiliary input terminal of the first UHB TX/RX module 201.

As shown in FIG. 5, the first envelope tracker 221 and the second envelope tracker 222 are each shared across multiple modules.

In certain embodiments herein, a UHB architecture for an RF front-end system includes any combination of the following features: (i) at least one UHB TX/RX module programmable for n77, n78, and/or n79; (ii) at least one UHB TX/RX module with 1 filtered output that is not an LNA output; (iii) at least one UHB TX/RX module with 3 auxiliary outputs; (iv) at least one UHB TX/RX module with 1 auxiliary input switchable to any output that is not an LNA output; (v) 2 UHB TX/RX modules and 3 UHB RX modules interconnected and connected to at least four antennas; (vi) at least one UHB RX module with 2 input or 2 output ports that is not an LNA output port; (vii) at least one UHB RX module with 1 auxiliary input switchable to any output that is not an LNA output port; (viii) a pair of UHB TX/RX modules each connected to a corresponding primary antenna without going through another module; (ix) one of a pair of UHB TX/RX modules connected to a secondary transmit antenna through a UHB RX module; and/or (x) one of a pair of UHB TX/RX modules connected to 2 UHB RX modules each receiving signals directly from a corresponding antenna.

Figure 6:
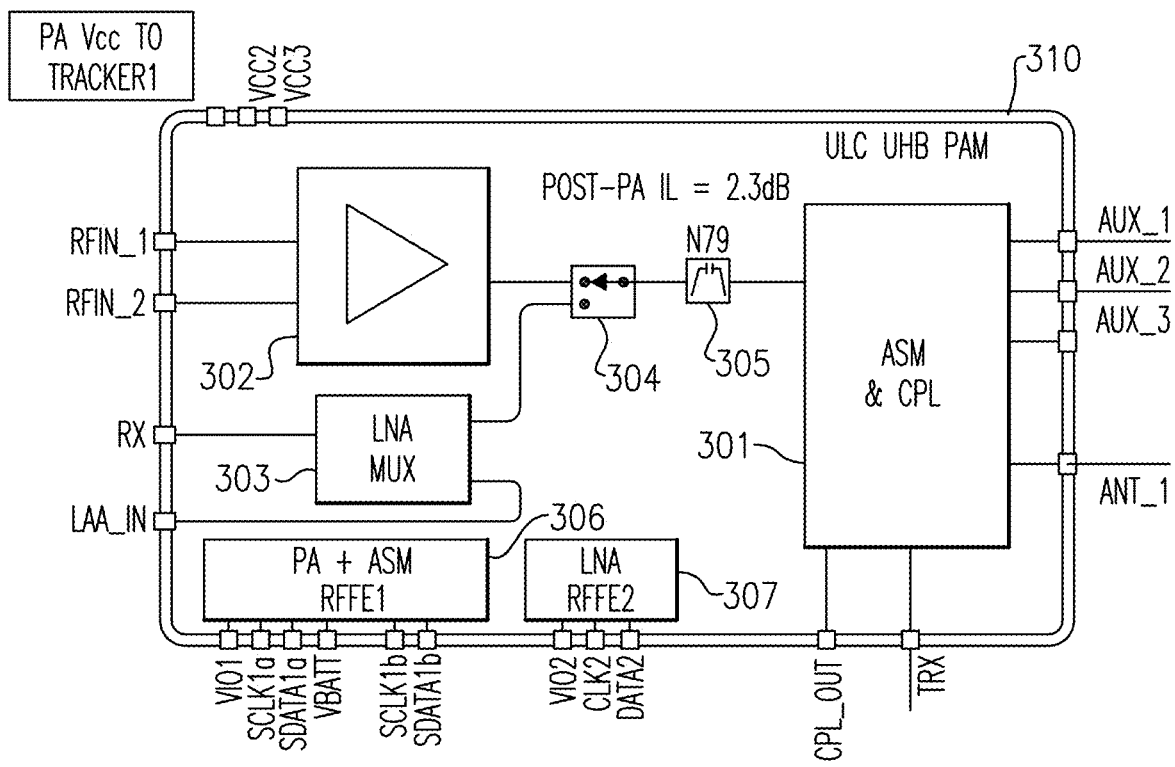
FIG. 6 is a schematic diagram of an ultrahigh band (UHB) transmit/receive (TX/RX) module according to one embodiment.

FIG. 6 is a schematic diagram of a UHB TX/RX module 310 according to one embodiment. The UHB TX/RX module 310 illustrates one embodiment of the first UHB TX/RX module 201 of FIG. 5.

As shown in FIG. 6, the UHB TX/RX module 310 includes an antenna switch module and coupler (ASM & CPL) 301, a power amplifier 302, a multiplexed LNA 303, a transmit/receive switch 304, an n79 filter 305, a power amplifier and ASM RFFE interface 306, and an LNA interface 307.

Figure 7:
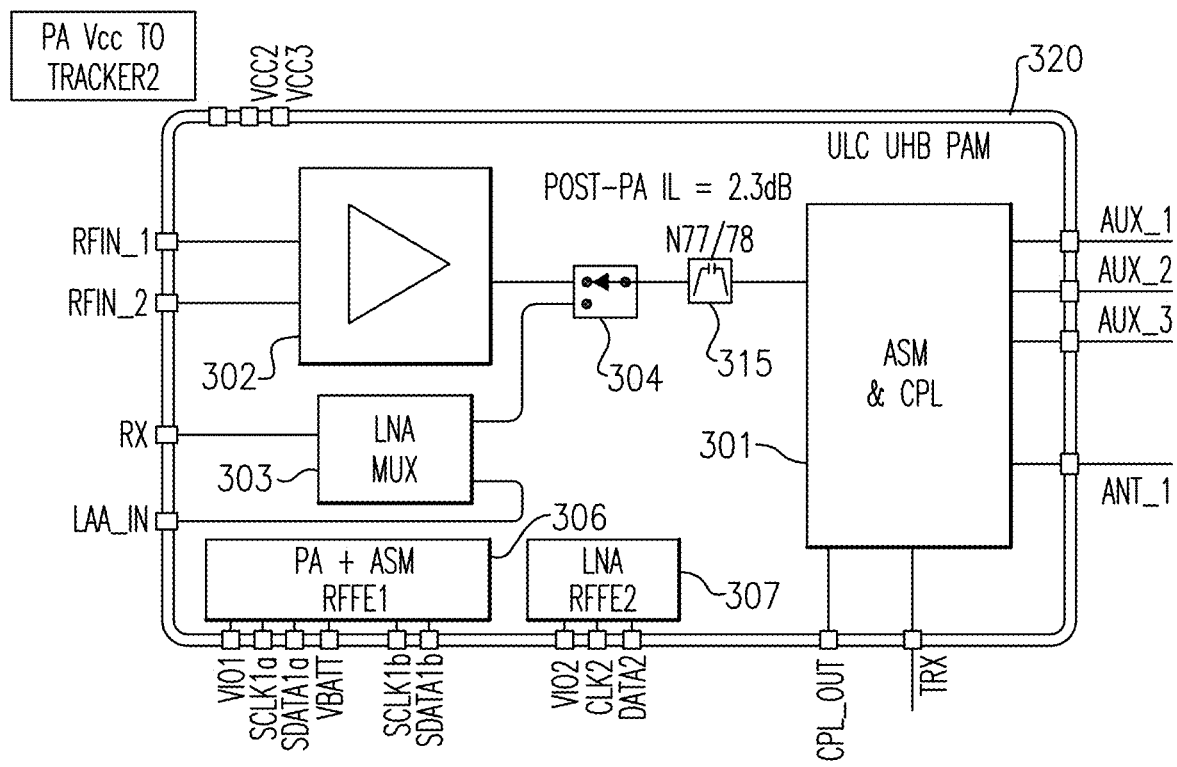
FIG. 7 is a schematic diagram of an UHB TX/RX module according to another embodiment.

FIG. 7 is a schematic diagram of an UHB TX/RX module 320 according to another embodiment. The UHB TX/RX module 320 illustrates one embodiment of the second UHB TX/RX module 202 of FIG. 5.

As shown in FIG. 7, the UHB TX/RX module 320 includes an ASM & CPL 301, a power amplifier 302, a multiplexed LNA 303, a transmit/receive switch 304, an n77/n78 filter 315, a power amplifier and ASM RFFE interface 306, and an LNA interface 307. Thus, the UHB TX/RX module 320 of FIG. 7 is similar to the UHB TX/RX module 310 of FIG. 6 except that the UHB TX/RX module 320 includes the n77/n78 filter 315 rather than the n79 filter 305.

Figure 8:
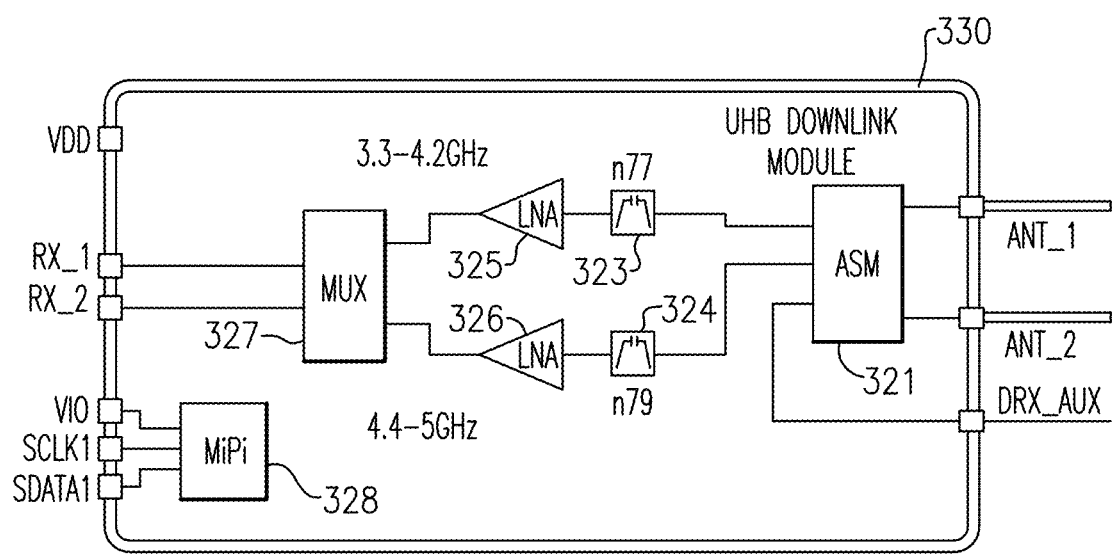
FIG. 8 is a schematic diagram of a UHB RX module according to one embodiment.

FIG. 8 is a schematic diagram of a UHB RX module 330 according to one embodiment. The UHB RX module 330 illustrates one embodiment of a UHB RX module that can serve as any of the first UHB RX module 203, the second UHB RX module 204, or the third UHB RX module 205 of FIG. 5. For example, three instantiations of the UHB RX module 330 can be included in the RF communication system 230 of FIG. 5.

As shown in FIG. 8, the UHB TX/RX module 330 includes an ASM 321, an n77 filter 323, an n79 filter 324, an n77 LNA 325, an n79 LNA 326, a multiplexer 327, and a MIPI RFFE interface 328.

Figure 9:
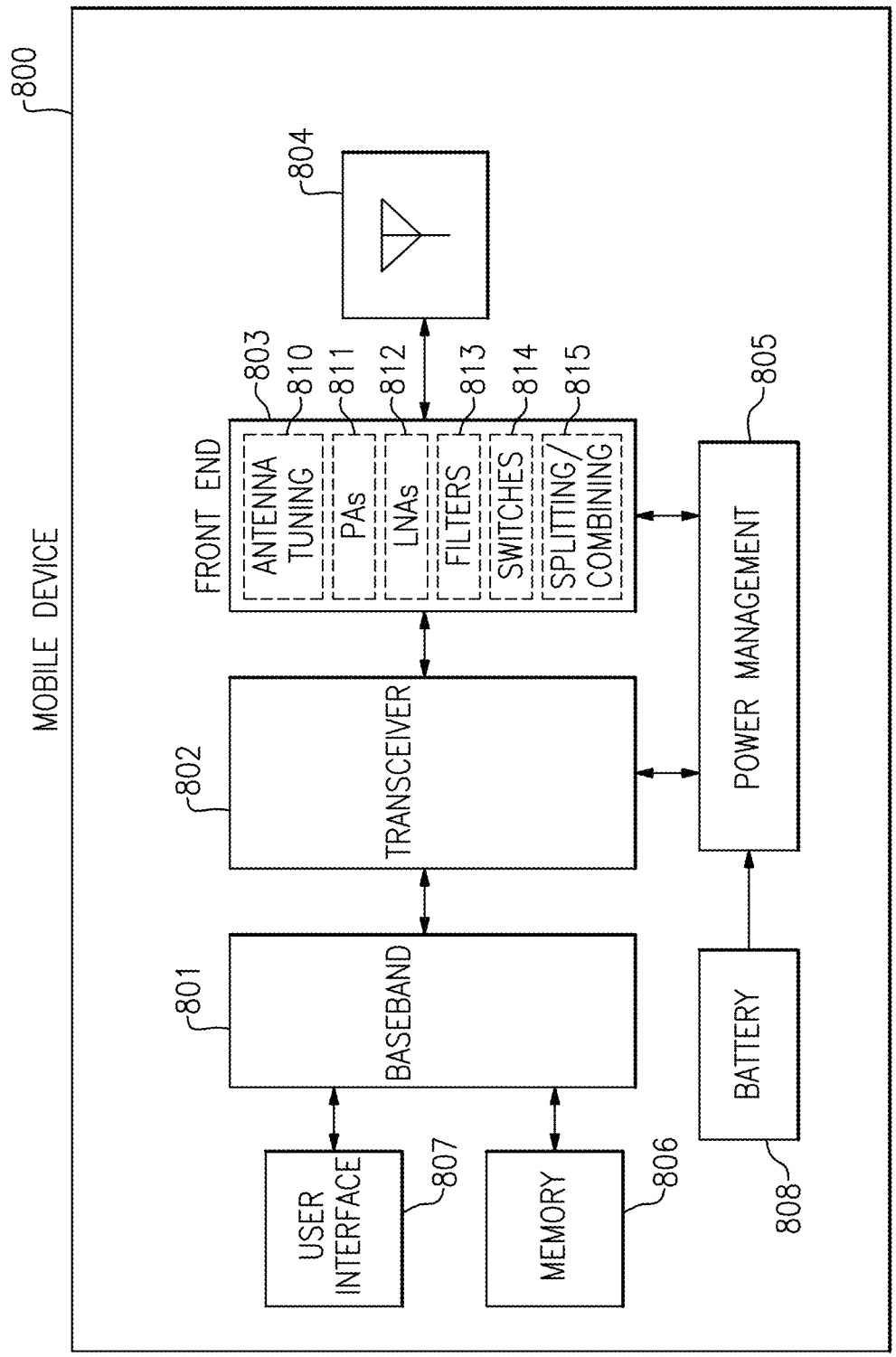
FIG. 9 is a schematic diagram of one embodiment of a mobile device.

FIG. 9 is a schematic diagram of one embodiment of a mobile device 800. The mobile device 800 includes a baseband system 801, a transceiver 802, a front-end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 9 as the transceiver 802. In one example, separate components (for instance, separate circuits or dies) can be provided for handling certain types of RF signals.

The front-end system 803 aids in conditioning signals transmitted to and/or received from the antennas 804. In the illustrated embodiment, the front-end system 803 includes antenna tuning circuitry 810, power amplifiers (PAs) 811, low noise amplifiers (LNAs) 812, filters 813, switches 814, and signal splitting/combining circuitry 815. However, other implementations are possible.

For example, the front-end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front-end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 9, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 9, the power management system 805 receives a battery voltage from the battery 808. The battery 808 can be any suitable battery for use in the mobile device 800, including, for example, a lithium-ion battery.

Applications

Some of the embodiments described above have provided examples in connection with mobile devices. However, the principles and advantages of the embodiments can be used for any other systems or apparatus that have needs for UHB architectures. Examples of such RF communication systems include, but are not limited to, mobile phones, tablets, base stations, network access points, customer-premises equipment (CPE), laptops, and wearable electronics.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, may, "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A mobile device comprising:
   a diplexer including a first diplexer terminal, a second diplexer terminal, and a third diplexer terminal;
   a cross-board cable;
   a plurality of antennas including a first antenna connected to the third diplexer terminal of the diplexer through the cross-board cable, and a second antenna;
   a transceiver; and
   a radio frequency front-end system electrically coupled between the transceiver and the plurality of antennas, the radio frequency front-end system including a first ultrahigh band transmit/receive module including a first antenna switch and a first transmit/receive switch that is connected to the first antenna by way of both the first antenna switch and a first signal route to the first diplexer terminal of the diplexer, a second ultrahigh band transmit/receive module including a second antenna switch and a second transmit/receive switch that is connected to the second antenna by way of both the second antenna switch and a second signal route to the second diplexer terminal of the diplexer, a first ultrahigh band receive module including a third antenna switch connected to the second antenna, a second ultrahigh band receive module including a fourth antenna switch, a third ultrahigh band receive module including a fifth antenna switch separate from the fourth antenna switch, a third signal route between the first antenna switch and the third antenna switch through a first auxiliary input to the first ultrahigh band receive module, a fourth signal route between the second antenna switch and the fourth antenna switch through a second auxiliary input to the second ultrahigh band receive module, and a fifth signal route between the second antenna switch and the fifth antenna switch through a third auxiliary input to the third ultrahigh band receive module.

2. The mobile device of claim 1 wherein the plurality of antennas further includes a third antenna and a fourth antenna, the second ultrahigh band receive module connected to the third antenna by way of the fourth antenna switch, and the third ultrahigh band receive module connected to the fourth antenna by way of the fifth antenna switch.

3. The mobile device of claim 1 further comprising a sixth signal route connecting the first antenna switch to the second antenna switch.

4. The mobile device of claim 1 wherein the first ultrahigh band transmit/receive module is operable over a first ultrahigh frequency band and the second ultrahigh band transmit/receive module is operable over a second ultrahigh frequency band.

5. The mobile device of claim 4 wherein the first ultrahigh frequency band is n79 and the second ultrahigh frequency band is n77.

6. The mobile device of claim 4 wherein the first ultrahigh band transmit/receive module is connected to the first antenna by way of a first filtering structure of the diplexer, and the second ultrahigh band transmit/receive module is connected to the first antenna by way of a second filtering structure of the diplexer.

7. The mobile device of claim 6 wherein the first filtering structure provides band filtering for the first ultrahigh frequency band, and the second filtering structure provides band filtering for the second ultrahigh frequency band.

8. The mobile device of claim 1 wherein an auxiliary output of the first ultrahigh band transmit/receive module is connected to the second auxiliary input of the second ultrahigh band transmit/receive module.

9. The mobile device of claim 1 further comprising a power management system including a first envelope tracker configured to generate a first power amplifier supply voltage for the first ultrahigh band transmit/receive module and a second envelope tracker configured to generate a second power amplifier supply voltage for the second ultrahigh band transmit/receive module.

10. The mobile device of claim 9 further comprising at least one module also powered by the first envelope tracker.

11. A radio frequency front-end system comprising:
    a diplexer including a first diplexer terminal, a second diplexer terminal, and a third diplexer terminal;
    a cross-board cable;
    a plurality of antenna terminals including a first antenna terminal connected to the third diplexer terminal of the diplexer through the cross-board cable, and a second antenna terminal;
    a plurality of ultrahigh band modules including a first ultrahigh band transmit/receive module including a first antenna switch and a first transmit/receive switch that is connected to the first antenna terminal by way of both the first antenna switch and the first diplexer terminal of the diplexer, a second ultrahigh band transmit/receive module including a second antenna switch and a second transmit/receive switch that is connected to the first antenna terminal by way of both the second antenna switch and the second diplexer terminal of the diplexer, a first ultrahigh band receive module including a third antenna switch connected to the second antenna terminal, a second ultrahigh band receive module including a fourth antenna switch, and a third ultrahigh band receive module including a fifth antenna switch separate from the fourth antenna switch; and a plurality of signal routes including a first signal route between the first antenna switch and the first diplexer terminal of the diplexer, a second signal route between the second antenna switch and the second diplexer terminal of the diplexer, a third signal route between the first antenna switch and the third antenna switch through a first auxiliary input to the first ultrahigh band receive module, a fourth signal route between the second antenna switch and the fourth antenna switch through a second auxiliary input to the second ultrahigh band receive module, and a fifth signal route between the second antenna switch and the fifth antenna switch through a third auxiliary input to the third ultrahigh band receive module.

12. The radio frequency front-end system of claim 11 wherein the plurality of antenna terminals further includes a third antenna terminal and a fourth terminal, the second ultrahigh band receive module connected to the third antenna terminal by way of the fourth antenna switch, and the third ultrahigh band receive module connected to the fourth antenna terminal by way of the fifth antenna switch.

13. The radio frequency front-end system of claim 11 wherein the plurality of signal routes further includes a sixth signal route connecting the first antenna switch and the second antenna switch.

14. The radio frequency front-end system of claim 11 wherein the first ultrahigh band transmit/receive module is operable over a first ultrahigh frequency band and the second ultrahigh band transmit/receive module is operable over a second ultrahigh frequency band.

15. The radio frequency front-end system of claim 11 wherein each of the plurality of ultrahigh band modules operate in a frequency range between about 3.0 gigahertz and about 6.0 gigahertz.

16. A method of radio frequency signal communication in a mobile device, the method comprising:

transmitting a first transmit signal and receiving a first receive signal by way of a first antenna and a diplexer using a first ultrahigh band transmit/receive module, the diplexer including a first diplexer terminal, a second diplexer terminal, and a third diplexer terminal that is connected to the first antenna through a cross-board cable, and the first ultrahigh band transmit/receive module including a first antenna switch and a first transmit/receive switch that is connected to the first antenna by way of both the first antenna switch and a first signal route to the first diplexer terminal of the diplexer;

transmitting a second transmit signal and receiving a second receive signal by way of the first antenna and the diplexer using a second ultrahigh band transmit/receive module, the second ultrahigh band transmit/receive module including a second antenna switch and a second transmit/receive switch that is connected to the first antenna by way of both the second antenna switch and a second signal route to the second diplexer terminal of the diplexer;

receiving a third receive signal by way of a second antenna using a third antenna switch of a first ultrahigh band receive module;

transmitting a third transmit signal from the first ultrahigh band transmit/receive module to the second antenna by way of a third signal route between the first antenna switch and the third antenna switch through a first auxiliary input to the first ultrahigh band receive module;

transmitting a fourth transmit signal over a fourth signal route between the second antenna switch and a fourth antenna switch of a second ultrahigh band receive module through a second auxiliary input to the second ultrahigh band receive module; and transmitting a fifth transmit signal over a fifth signal route between the second antenna switch and a fifth antenna switch of a third ultrahigh band receive module through a third auxiliary input to the third ultrahigh band receive module, the fifth antenna switch being separate from the fourth antenna switch.

17. The method of claim 16 further comprising receiving a fourth receive signal by way of a third antenna using the second ultrahigh band receive module, and receiving a fifth receive signal by way of a fourth antenna using the third ultrahigh band receive module.

18. The method of claim 17 further comprising transmitting the fourth transmit signal on the third antenna and transmitting the fifth transmit signal on the fourth antenna.

19. The method of claim 16 further comprising transmitting a sixth transmit signal over a sixth signal route connecting the first antenna switch and the second antenna switch.

20. The method of claim 16 further comprising generating a first power amplifier supply voltage for the first ultrahigh band transmit/receive module using a first envelope tracker, and generating a second power amplifier supply voltage for the second ultrahigh band transmit/receive module using a second envelope tracker.

\* \* \* \* \*